United States Patent [19]
Burton et al.

[11] 3,918,077
[45] Nov. 4, 1975

[54] TRANSLATIONAL SHUTTER SYSTEM

[75] Inventors: John S. Burton, Los Angeles; Ronald L. Whitney, San Fernando, both of Calif.

[73] Assignee: Terminal Data Corporation, Woodland Hills, Calif.

[22] Filed: May 6, 1974

[21] Appl. No.: 467,525

[52] U.S. Cl. .................... 354/234; 354/248; 355/71
[51] Int. Cl.² ............................................ G03B 9/36
[58] Field of Search ....... 354/48, 50, 226, 187, 234, 354/245, 247, 248, 255; 355/71, 53; 350/266, 269, 271, 272; 352/204, 207

[56] References Cited
UNITED STATES PATENTS
1,366,158   1/1921   Brown................................ 354/187

*Primary Examiner*—Samuel S. Matthews
*Assistant Examiner*—James LaBarre
*Attorney, Agent, or Firm*—Harry R. Lubcke

[57] ABSTRACT

A translational bi-directional shutter system, electrically operable, and having control logic coactive with exposure-time-determination instrumentalities. Sensors detect the end positions of a blade shutter. A large central aperture allows exposure, and the alignment thereof with the optical path is sensed by counting actuation pulses, or by a third sensor. Typically the blade is moved by a stepper motor.

9 Claims, 5 Drawing Figures

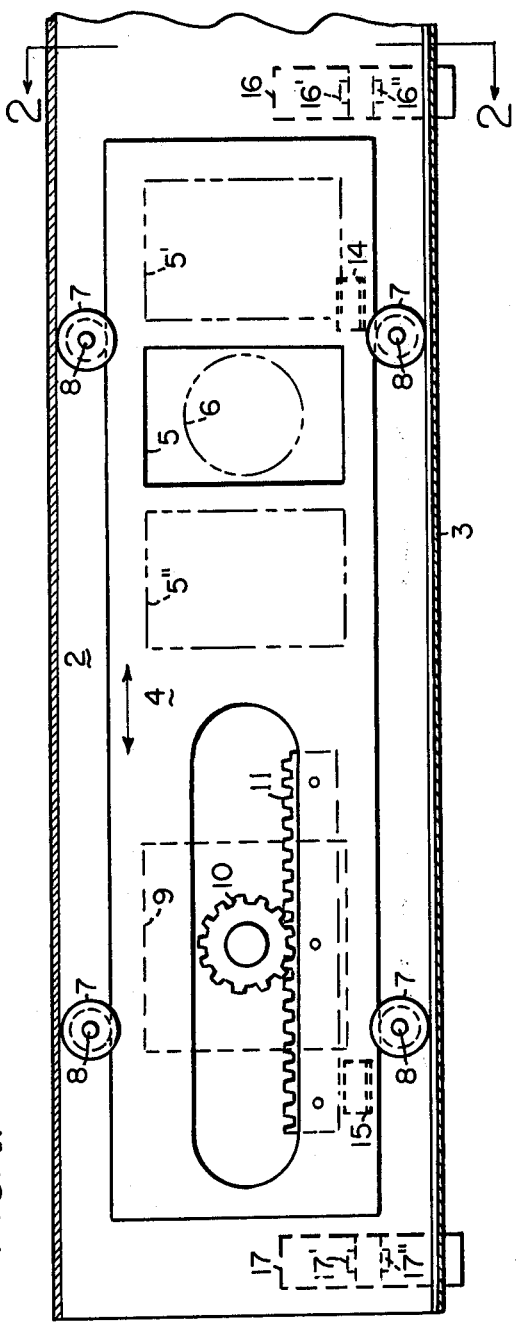
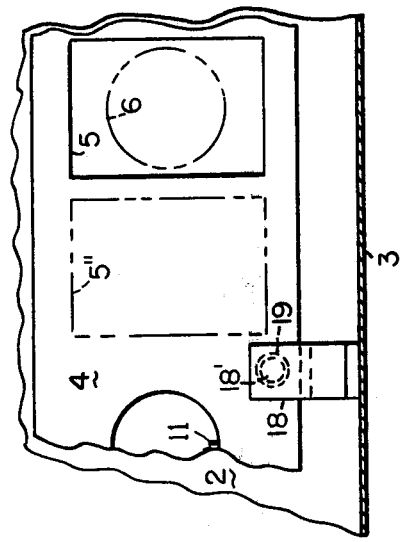
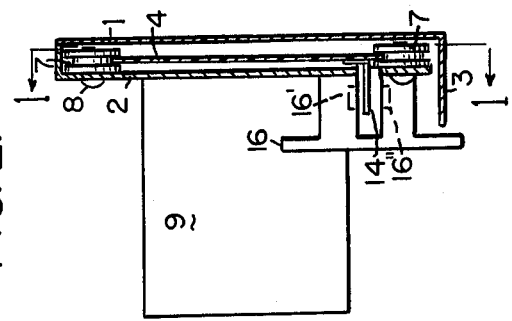
FIG. 1.
FIG. 2.
FIG. 3.

3,918,077

TRANSLATIONAL SHUTTER SYSTEM

BACKGROUND OF THE INVENTION

This invention relates to photography, particularly to electric control of the opening and closing of a shutter.

The prior art has most frequently been concerned with focal-plane slit type shutters, in which constant velocity of the shutter curtain across the whole traverse is a requirement. This requirement has been met with a specially designed linear actuator that is relatively devoid of control logic.

Another arrangement has depended upon a stretched spring to provide motive power, with a ratchet and pawl type of electrical solenoid acting as an adjustable brake. Exposure control means arrange for a slow traverse of a shutter having a long full-open aperture for weak illumination of the scene to be photographed and a rapid traverse for strong illumination.

Another arrangement utilizes a lever type rotary shutter that is actuated by a rotary solenoid electrical device.

In general, the drive and control of the shutter has been mechanical. Exposure control facilities, if provided, have been electronic; from simple to involved arrangements, and have been arranged to control the velocity of the shutter in passing across the optical path involved.

BRIEF SUMMARY OF THE INVENTION

In order to provide a shutter having a long life the shutter according to this invention was made mechanically simple by forming a whole-aperture-opening blade and providing control thereof by electronic logic. The logic of this invention may be controlled as to the exposure interval by the logic of a copending patent application having a common assignee and coinventor Burton, entitled "Electronic Exposure Control," Ser. No. 458,167, filed Apr. 4, 1974.

An exemplary embodiment employs solid-state optical sensors to sense when the shutter blade is at one extreme or the other, thereby to appropriately direction a stepper motor for the next exposure. The blade is stopped, say, in mid-traverse, either by logic that counts the steps of the stepper motor to that position, or by a further sensor that is influenced by the blade when it is in the center position.

In the center position the optical path of the camera, or equivalent, is not obscured by the shutter in any way. Thus, constant velocity of traverse of the shutter is required only during the opening and closing motions and banding is eliminated. Also, variable width moving slits in curtain shutters are not employed.

BRIEF DESCRIPTION OF THE DRAWINGS

FIG. 1 shows a front elevation of the mechanical shutter, partly in section along line 1—1 in FIG. 2.

FIG. 2 shows an end elevation of the mechanical shutter, partly in section along line 2—2 in FIG. 1.

FIG. 3 is a fragmentary front elevation showing of the shutter for the alternate three-sensor embodiment.

DESCRIPTION OF THE PREFERRED EMBODIMENTS

Figure 4:
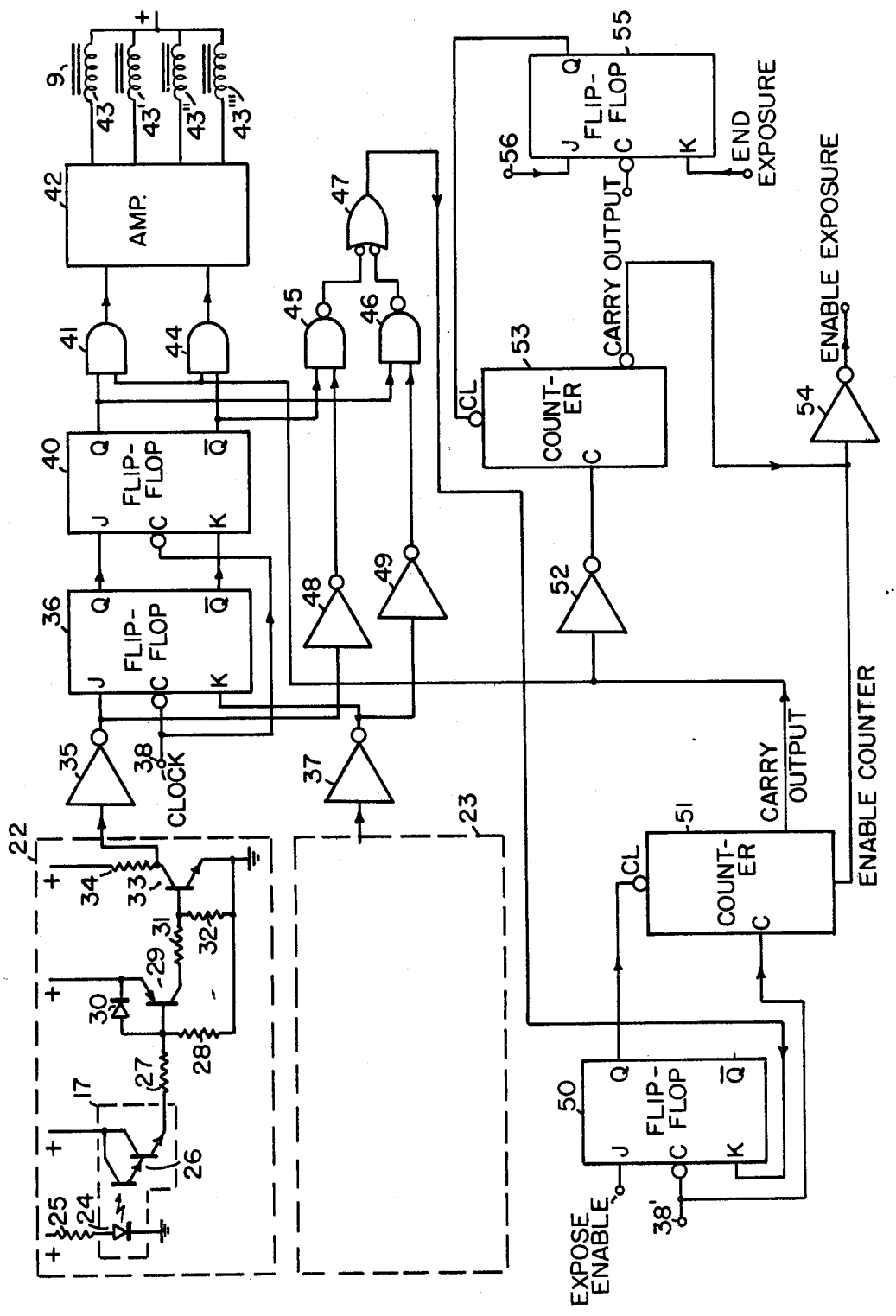
FIG. 4 is a schematic diagram of the control logic for the two-sensor and counter embodiment.

In FIGS. 1 and 2 numeral 1 indicates the front of the shutter frame, numeral 2 the rear, and numeral 3 the lower lip. The frame is typically formed of metal, such as steel, and serves to secure the several operative elements in a fixed relation.

Shutter blade 4 reciprocates from left to right and vice-versa in FIG. 1. It is shown in the center or shutter open position. Since low inertia is a desirable characteristic of the shutter blade, it is formed of a light material, such as aluminum, and is given a dull black finish, as by anodizing.

Shutter blade 4 is provided with an optical aperture 5. This is sufficiently large to completely uncover the optical path involved. In FIG. 1 this path is illustrated in phantom by lens 6. The shutter closed position to the right for aperture 5 is shown in phantom by 5' and to the left by 5''. These positions are attained by a corresponding movement of the whole shutter blade 4, as will be understood without this being illustrated.

The shutter blade is arranged for translation by a plurality of grooved rollers 7, say four, that are affixed to the rear surface 2 of the frame by means of axle-fastenings 8. The blade translates in the grooves of the rollers, and so is restrained from any motion other than the desired translation transverse of the optical path. The rollers are typically formed of nylon.

The shutter blade is translated, typically, by stepper motor 9, through pinion 10 and rack 11. A suitable motor may be obtained from the Computer Devices Corporation; being a four-phase variable-reluctance type with 15° steps. The pinion may be of metal. The rack is preferably of nylon or equivalent, so as to be light in weight and to have effective wearing qualities with respect to the metal pinion.

The extent of the required reciprocatory traverse by blade 4 is determined by the width of the optical path involved. This may be about 0.5 inch, in which case the aperture is of the order of 0.6 inch and the travel is somewhat over three times this dimension. The required length of rack 11 is thereby determined, as are the positions of the sensor-obscuring parts of the blade. In FIG. 1 these are angles 14 and 15. These are appropriately positioned so that angle 14 moves into right-hand sensor 16 when the blade is at the extreme right of its desired stroke and that angle 15 moves into left-hand sensor 17 when the blade is at the extreme left of its desired stroke.

Sensors 16 and 17 may be comprised of a light-emitting diode 16' and 17' and a photo-sensitive transistor 16'' and 17'', which are arranged in the mounting across a slot into which angles 14 and 15 move to intercept the light when the blade is at one extreme end of the traverse, or at the other end. Such a sensor package is obtainable in the General Electric type H13Bl opto-coupler.

FIG. 3 has the same configuration as FIG. 1, save that an additional sensor 18 has been added at approximately the center of the frame-shutter assembly.

Sensor 18 may be the same type as sensors 16 and 17, but it is oriented 90° differently therefrom, so that the slot thereof engages the shutter blade 4, itself. The blade has been shown in the center, or "open"position, in both FIGS. 1 and 3. In FIG. 3 an additional aperture 19 is formed in the lower central part of blade 4, so that when the blade is open the additional aperture will be aligned with light-emitting diode 18' and the photo-sensitive transistor (not shown, since it is behind the diode). Thus, the sensor will give an electrical output when the blade is in the center position. This output takes the place of the counting logic of FIG. 4, providing an output from entity 60 in FIG. 5.

In the two-sensor arrangement of logic as shown in FIG. 4 rectangle 22 encompasses sensor 17 and the accompanying amplification to provide logic-level voltage response from the sensor.

Within the rectangle, light-emitting diode (LED) 24 is powered from source of power "+" of typically positive 5 volts d.c. through resistor 25, which may have a resistance of the order of 200 ohms. This results in the LED being continuously light-emitting. This illumination passes directly to the light-sensitive transistor 26, a Darlington pair, except when angle 15 on the shutter blade interferes, as it does at the extreme left excursion of the blade.

This output enters a transistorized stage of amplification through isolation resistor 27, which has a resistance of the order of 3,000 ohms, and over a base to ground return resistor 28 of 22,000 ohms. PNP transistor 29 may be the 2N4403 type. Diode 30, a 1N914, is connected with the anode to the base and the cathode to the emitter of the transistor to insure that the base-to-emitter breakdown voltage is not exceeded.

The emitter is connected to a source of positive energizing potential and the collector is connected to isolating resistor 31, of 1,000 ohms, and that to the base of transistor 33. The base thereof is also connected to ground through resistor 32, 10,000 ohms. Transistor 33 may be a 2N4401, an NPN type. The emitter thereof is connected directly to ground. The collector is connected to a source of actuating voltage, of plus 5 volts, through resistor 34, of 220 ohms.

What is then the effective output from sensor 17 is taken from the emitter of transistor 33 and impressed upon inverting amplifier 35 in order to drive the "J" input of J-K flip-flop 36.

In a similar manner the output of right-hand sensor 16 is taken from rectangle 23, which has the same circuit inside of it as has been described for rectangle 22, and through inverting amplifier 37 is connected to the "K" input of flip-flop 36.

The "clock" input at terminal "C" for flip-flop 36 is typically 125 kilohertz, from a known external source. The waveform may be pulse or square-wave.

The "Q" output of flip-flop 36 is connected to the "J" input of flip-flop 40; also the $\bar{Q}$ to the K, and the clock "C" to the common clock source.

The Q output of flip-flop 40 passes to one input of AND gate 41. When this gate is otherwise supplied with an input, an output is obtained from the gate and this is conveyed to stepper motor driver amplifier 42 to the input connection thereof that causes forward rotation of stepper motor 9. Amplifier 42 is available from the manufacturer of the stepper motor and has a four-phase output. These outputs are connected in sequence to the four windings of the motor, 43, 43', 43" and 43'''. The opposite ends of these windings are connected together and to a source of positive d.c. power, having a voltage, for instance, of 30 volts.

The $\bar{Q}$ output of flip-flop 40 passes to one input of AND gate 44. When this gate is otherwise supplied with an input, an output is obtained from the gate and this is conveyed to drive amplifier 42 to a second input connection that causes reverse rotation of motor 9.

Gates 45, 46, 47 are "end detector gates." One input of NAND gate 45 connects to the $\bar{Q}$ output of flip-flop 40. The other input is connected to the effective output of sensor 17 at the output of amplifier 35. This is accomplished through isolating amplifier 48, of the inverting type. In a similar manner, one input of NAND gate 46 connects to the Q output of flip-flop 40. The other input is connected through isolating amplifier 49 to the effective output of sensor 16 at the output of amplifier 37.

The outputs of gates 45 and 46 enter the two inputs of NOR gate 47. The output therefrom is connected to the K input of J-K flip-flop 50.

The J input of flip-flop 50 is connected to the "expose enable" logic output from associated apparatus to be further defined later. The C input is connected at 38' to the same 125 kilohertz clock previously set forth as connected to terminal 38. The Q output of flip-flop 50 is connected to the clear CL input of binary counter 51, which may be a SN74163 type. The "carry output" of counter 51 occurs each 16 clock pulses impressed upon it at input C. Thus, the 125 kilohertz frequency is reduced to a frequency of 500 hertz. This output is connected to the second input of both gates 41 and 44, thereby providing pulses for driving the stepper motor in one direction or the other, when these gates are otherwise enabled. This output is also connected to inverting amplifier 52 and thence to the C clock input of second binary counter 53, which may be a SN74193 type.

The carry output from counter 53, being inverted, also gives an output each 15 input pulses impressed upon this input terminal C, in order that the stepper motor will be stopped at the center of the excursion of the shutter. This output passes through isolating-amplifying amplifier 54, with inversion, to exposure control apparatus to be found in the "Exposure Control" patent application of coinventor Burton previously referred to; namely, terminal 62 of FIG. 3 thereof.

This is necessary in this illustrative joint embodiment so that a subsequent response can be obtained from the exposure control apparatus, to the effect that the exposure should now be completed, since the open interval has been sufficient to properly expose the film for the light intensity reflected from the document involved. Accordingly, the outgoing terminal in this FIG. 4 is entitled "enable exposure".

From the exposure control apparatus referred to, flip-flop 55 obtains an end exposure pulse at the K input. This is pulse waveform G from transistor 40 of the exposure control apparatus. Therein, optical element and control logic block 44 is, as one example, the mechanism and logic of this invention. Previously, the J input of flip-flop 55, terminal 56, has received an "intensity check command" from logic associated with the handling of the document itself; as from the copending patent application, "Two-Sided Document Recorder," by coinventors Burton and Whitney, Ser. No. 405,354, filed Oct. 11, 1973; namely, vacuum switch 70 of FIGS. 1 and 8 therein.

The Q output of flip-flop 55, herein, is connected to the CL, clear, terminal of counter 53. The C, clock terminal of flip-flop 55 is supplied with the same clock pulses previously described in connection with terminal 38.

In the operation of the logic of FIG. 4, assume that the shutter blade 4 is at the left end of its travel. In this situation, flip-flop 36 is in the set state; i.e., the Q output is high, as at +5 volts. Flip-flop 40 is also in the set state. Flip-flop 50 is in the reset state; i.e., the Q output is high, as at +5 volts. This is because a document has not yet reached the exposure station, and there is no response from vacuum switches 73 and 74 of FIGS. 1, 7 and 8 of the "Two-Sided Document Recorder" patent application previously referred-to. This response enters the logic of the present FIG. 4 at the J terminal of flip-flop 50. Flip-flop 55 is similarly in the reset state, since there has not yet been an intensity check command from terminal 56 impressed upon the J input of this flip-flop.

Assume now that a document is moved through the transport machine, and that it has progressed sufficiently far to affect switch 70 of that apparatus. This initiates an intensity check command, which puts flip-flop 55 in the set state.

This enables counter 53 by lifting the CL terminal from ground, but does not allow it to begin counting, chiefly because counter 51 has not yet been enabled and clock pulses therefore do not pass therefrom into terminal C of counter 53. Counter 51 is impotent because the CL terminal thereof is still held at ground potential.

After further progress of the document it is in position for photographing and the exposure enable pulse is received from the Two-Sided Document Recorder at the J input of flip-flop 50, which then goes true, with Q going to high.

The clock input terminal C is always on. When counter 51 is enabled it thus counts each 16 input clock pulses and gives one output pulse at the carry output of 500 hertz repetition rate.

Since the shutter blade is at the left end of its travel, gate 41 is enabled from the response from sensor 17, and so the carry output from counter 51 is passed by gate 41 and amplifier 42 operates to step motor 9 in the forward direction.

The pulses from counter 51 are counted by counter 53 and when 16 of these have been counted the $\overline{\text{carry}}$ $\overline{\text{output}}$ of counter 53 goes "low"; i.e., to ground potential. This ground signal passes to the "enable counter" terminal of counter 51, and the motor stops the shutter blade in the middle, or fully opened position.

The $\overline{\text{carry}}$ $\overline{\text{output}}$ of counter 53 is also connected to the input of amplifier 54, and at the same time the "enable exposure" output from this amplifier is activated and the start of the exposure interval is initiated in the "Exposure Control" patent application logic previously described.

When the required exposure interval has been completed a response from the Exposure Control logic is obtained in the form of a pulse from the end exposure input at terminal K of flip-flop 55. This resets this flip-flop, putting ground potential on Q thereof. This clears counter 53, which enables counter 51 again. The latter resumes counting, and so the stepper motor continues the traverse until it is shut off by the blade being closed and encountering a signal from sensor 16.

The logic and shutter mechanism is now arranged to begin a reverse excursion upon the next document being positioned to start the operation.

Terminal $\overline{Q}$ of flip-flop 36 is "true," i.e., "high," at +5 volts, and the flip-flop is in the "reset" condition. The same "true" condition obtains at terminal $\overline{Q}$ of flip-flop 40.

Thus, gate 44 is in enable status, and when the carry output of counter 51 appears, upon several auxiliary conditions being met as has previously been explained, stepper amplifier 42 is empowered to step motor 9 in the reverse direction.

The sequence for opening the shutter, holding it open by stopping the stepper motor, and then closing it when the exposure control logic sends the information pulse that the exposure is to be terminated, is then repeated, as has previously been explained, but now in the opposite direction of travel of the shutter blade 4.

A delay of one clock pulse is occasioned by the presence in the logic of the two flip-flops 36 and 40. This delay of one clock pulse before the Q output of flip-flop 40 goes true is to insure than an end exposure will reset flip-flop 50 by putting the input at K thereof true.

Figure 5:
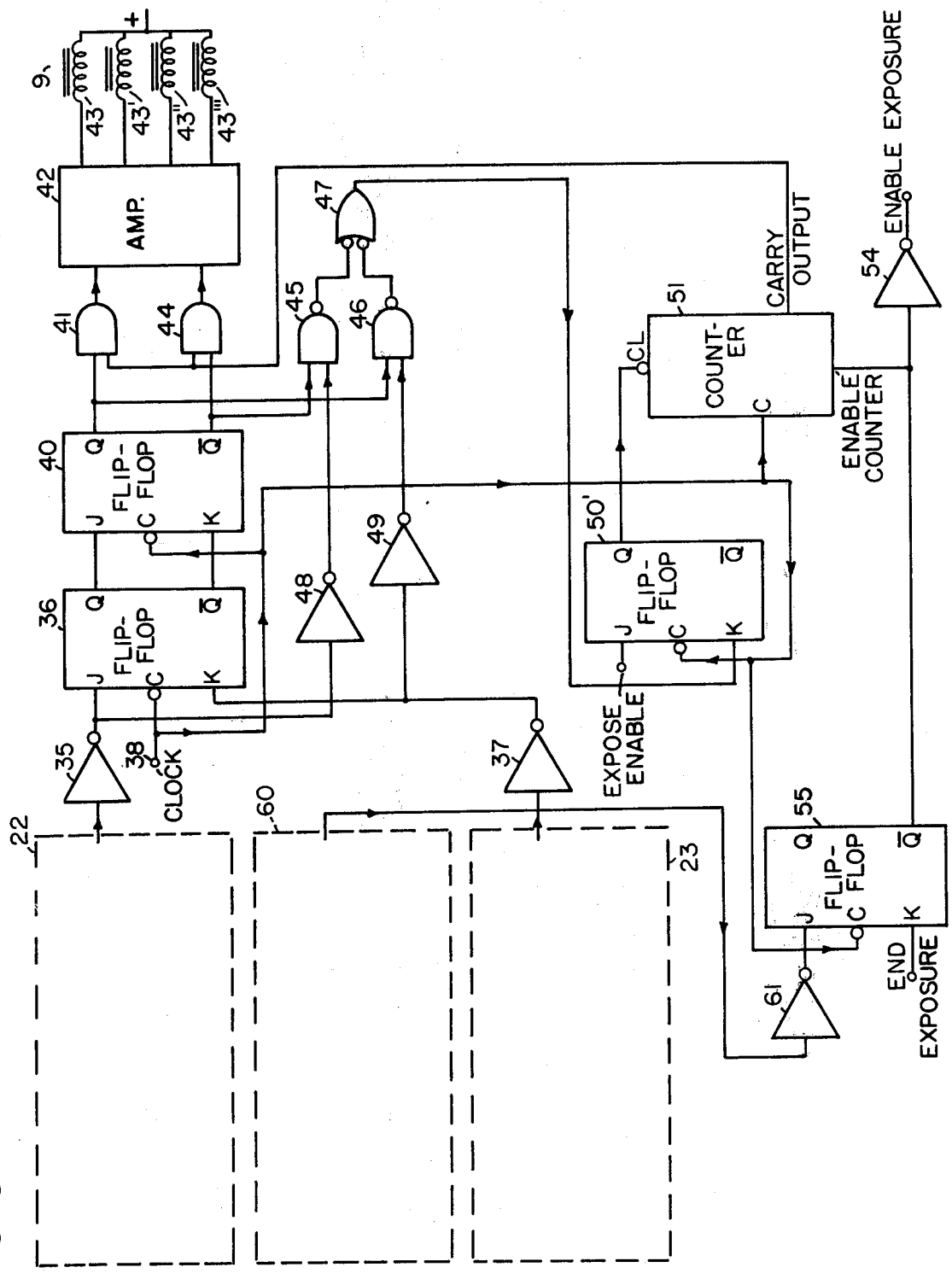
FIG. 5 is the same for the three-sensor embodiment.

FIG. 5 shows the control logic for the three-sensor embodiment. As such, it duplicates much of FIG. 4, and such elements as are the same are represented by the same reference numerals. In FIG. 4 the circuitry for sensor 17 was shown completely in rectangle 22. Rectangle 23, left blank, was identified as a duplicate of rectangle 22, and was the circuitry for sensor 16.

In FIG. 5, rectangles 22 and 23 appear, as does a new rectangle 60. The latter represents duplicate circuitry for the new third sensor 18, of FIG. 3.

Each end logic in FIG. 5 is the same as in FIG. 4. This embraces elements 35 through 49. The structure and functioning in each case is the same and has been treated previously herein.

Passing now to the revised structure and functioning due to the third sensor, the output of rectangle 60, from sensor 18, enters inverting amplifier 61 (in the same manner as that from rectangle 22 entered amplifier 35). The output from amplifier 61 enters the J input of flip-flop 55'. This flip-flop is of the same type as flip-flop 55 of FIG. 4 and has essentially the same connections, so as to perform in an equivalent manner.

In the same way flip-flop 50' functions as did flip-flop 50. Chiefly, it accepts the output of the end detector gates 45, 46, 47, at the K input. The Q output clears counter 51 at the appropriate time, as before.

The terminals receiving or passing on various signals from or to associated logic having to do with the document transport and exposure control, such as expose enable, enable exposure, and end exposure are the same in FIG. 5 as they were in FIG. 4.

The control of the stepper motor 9 is the same for the end-of-traverse performance in each of FIGS. 4 and 5. The stop of the stepper motor in the middle is also the same from the carry output of counter 51 in each figure. It is only the manner in which the counter is stopped that is different in the two figures, and this is clear from a consideration of FIG. 3 in relation to FIG. 5.

The flip-flops predicated herein are exemplary of relaxation logic.

We claim:
1. A translational bi-directional shutter system comprising;
  a. a shutter blade (4) having an aperture (5),
  b. means to reciprocate (9,10,11) said blade transversely of an optical path to selectively moved said aperture into and out of alignment with said optical path to define open closed positions respectively,
  c. plural sensors (16,17) spaced to sense the position of said blade, and
  d. logic means (35-56) controlled by said sensors to actuate said means to reciprocate said blade, whereby said blade is selectively translated from a first closed position to said open position with respect to said optical path,
thereafter farther to a second closed position,
and thereafter to selectively repeat this sequence with the blade moving in the opposite direction.

2. The shutter system of claim 1, in which;
   a. one sensor (17) is positioned at an extremity of the traverse of said blade such that the blade affects it at said first closed position
   and one sensor (16) is positioned at another extremity of the traverse of said blade such that the blade affects it at said second closed position, and
   b. said shutter blade has an opaque portion (15,14) to affect each sensor when it is in the corresponding closed position.

3. The shutter system of claim 1, in which;
   a. said means to reciprocate said blade includes a stepper motor (9), and
   b. said logic means includes counting means (53) programmed to supply to said stepper motor a selected number of pulses to translate said blade from a closed (5') to the open (5) position.

4. The shutter system of claim 3, in which said logic means includes;
   a. a pair of flip-flops (36,40),
   b. a pair of gates (41,44),
   c. a pair of counters (51,53) having carry outputs,
   d. amplifier means (42) to drive said stepper motor,
   e. a connection (J) from one said sensor to one said flip-flop (36) and therethrough to a said gate (41) whereby said amplifier means is energized to drive said stepper motor in the appropriate direction to open the shutter, and
   f. a connection from a said counter (51) to said gates whereby a carry output therefrom stops said stepper motor when substantially half of the steps required to translate said blade from said first to said second closed positions have been executed.

5. The shutter system of claim 2, in which;
   a. each said sensor is comprised of a light-emitting (16') and a light-sensitive (16") means,
   b. each extremity of said shutter blade has a projection (14), which blocks the path between said light-emitting and said light-sensitive means when said blade is at an extremity of travel, and
   c. intermediate the extremities said shutter blade includes rack means (11) for traversing the blade between said extremities.

6. The shutter system of claim 4, which additionally includes;
   a. a first gate (45) connected to one (41) of said pair of gates
   and to a said sensor (17,35),
   b. a second gate (46) connected to the other (44) of said pair of gates
   and to an other sensor (16,37),
   c. a third gate (47) connected to the outputs of said first and second gates
   and to relaxation logic (50)
   to logically state that said shutter blade is at the end of a traverse.

7. The shutter system of claim 1, which additionally includes;
   a. plural oppositely disposed grooved rollers (7) positioned to carry said shutter blade in the translation thereof.

8. The shutter system of claim 1, in which;
   a. one said sensor (16 or 17) is positioned at each extremity of traverse of said shutter and one said sensor (18) is positioned intermediate these extremities, and
   b. said blade has opaque portions (14,15,19) to selectively influence only one said sensor at any one time.

9. The shutter system of claim 8, in which said logic means includes;
   a. a counter (51),
   b. relaxation and gating logic (36,40 & 41,44) connected to each extremity sensor (16,17) and to said counter to control the traverse of said shutter blade (4), and
   c. further relaxation logic (55') connected to the intermediate sensor (18)
   and to said counter (51)
   to interrupt the traverse of said shutter blade intermediate the extremity positions thereof.

* * * * *